(12) United States Patent
Smith

(10) Patent No.: US 6,170,331 B1
(45) Date of Patent: Jan. 9, 2001

(54) DETECTING ROTATIONAL ACCELERATION

(75) Inventor: Ronald D. Smith, Phoenix, AZ (US)

(73) Assignee: Intel Corporation, Santa Clara, CA (US)

( * ) Notice: Under 35 U.S.C. 154(b), the term of this patent shall be extended for 0 days.

(21) Appl. No.: 09/364,166

(22) Filed: Jul. 30, 1999

(51) Int. Cl.[7] .................................................. G01P 15/00
(52) U.S. Cl. ..................................... 73/514.36; 73/514.17
(58) Field of Search .................................. 73/488, 514.36, 73/514.37, 514.17; 382/254; 348/208, 699; 396/52, 53, 54, 55

(56) References Cited

U.S. PATENT DOCUMENTS

| | | |
|---|---|---|
| 4,673,276 * | 6/1987 | Yoshida et al. ....................... 354/430 |
| 4,996,545 | 2/1991 | Enomoto et al. ....................... 396/53 |
| 5,101,669 | 4/1992 | Holm-Kennedy et al. ....... 73/862.64 |
| 5,450,126 | 9/1995 | Nishida ................................. 348/208 |
| 5,504,523 | 4/1996 | Wight et al. ......................... 348/208 |
| 5,852,750 * | 12/1998 | Kai et al. ..................................... 3/55 |
| 5,896,254 | 4/1999 | Sato et al. ............................. 360/126 |

* cited by examiner

*Primary Examiner*—Richard A. Moller
(74) *Attorney, Agent, or Firm*—Trop, Pruner & Hu, P.C.

(57) ABSTRACT

Rotational motion about at least two different axes may be resolved to measure the direction, magnitude and pivot point of the rotational displacements In some embodiments, these measurements may be made by a device which may be integrated into a silicon substrate using conventional silicon processing techniques. For example, a pair of accelerometers may be formed by a pair of cantilevered beam arrays. Rotational displacement of a camera imaging sensor, for example, may use such accelerometers integrated into the same silicon substrate forming the imaging sensor.

17 Claims, 3 Drawing Sheets

DETECTING ROTATIONAL ACCELERATION

BACKGROUND

This invention relates generally to detecting rotational acceleration and in particular embodiments to detecting rotational acceleration around at least two axes.

Acceleration can be measured using gyroscopes. However, gyroscopes tend to be expensive and are not always completely compatible with silicon based microelectronic products. In other words, gyroscopes cannot be easily integrated into a silicon format.

Thus, it is known to form accelerometers in silicon substrates. For example, cantilevered beam accelerometers may be incorporated into silicon substrates using etch processes to define the cantilevered beams. U.S. Pat. No. 5,101,669 describes a number of different techniques for forming silicon-based cantilevered beam accelerometers. Each cantilevered beam includes a flexure element and a proof mass at its unattached end. The response of the cantilevered beam to acceleration may be measured using capacitive or piezoresistive sensors. For example, a capacitive accelerometer may measure the displacement of the proof mass relative to the substrate by measuring the changing capacitance arising from the difference in the gap between the substrate and the proof mass.

However, when complex rotational acceleration is involved, the displacement of the cantilevered beam alone does not provide enough information to determine the precise nature of the sensed acceleration. Rotational acceleration has a direction, a magnitude and an axis of rotation or a pivot point. A cantilevered beam accelerometer can determine magnitude and direction but cannot determine the rotational center of the acceleration.

It desirable to know all three characteristics of rotational acceleration, for example in connection with blur compensating digital cameras. In digital cameras, the camera make shake relative to the object being imaged. The shaking may be due, for example, to the unsteadiness of the user's hands on a hand-held camera. As a result of the unsteadiness of the camera support relative to the imaged object, a variety of distortions may arise.

For example, referring to FIG. 1, displacements of the camera 10 along the axis X (which is parallel to the imaging axis of the camera 18), may result in changing the object distance. In effect, translation along the X axis alters the magnification of the image by modulating the camera to object distance. The sensitivity to this motion decreases as the object distance increases. For macro photographs, significant magnification modulation may arise from such motion. Conversely, a photograph of a scenic view may not change significantly. The same effect may occur along the Y and Z axes depicted in FIG. 1.

The sensitivity equation is different for rotation. Rotation in the YZ plane (i.e. rotation about the X axis) causes the image to streak in circles, the degree of streak varying between the center of rotation and maximum distance from the center in the image. Rotation in the XZ or XY planes causes apparent translation that gets worse as distance increases. For XZ and XY rotations, even the slightest shake disturbs the picture, particularly when the imaged object is far off in the distance.

Thus, various techniques have been considered to compensate for motion induced blurring. Some techniques attempt to electronically measure the motion by analyzing the captured image information. Other approaches attempt to measure the movement of the platform supporting the camera and to feed this information back to correct the image blurring.

However, all of these techniques suffer a variety of disadvantages. Predominantly, such techniques are not easily incorporated into the same silicon substrates which form the imaging arrays of the digital imaging systems. As a result, they add components and cost to the overall system.

Thus, there is a continuing need for an effective way locate the rotational center of rotational acceleration around more than one axis. In particular, in connection with digital imaging applications for example, it is desirable to provide acceleration measurement technology which may be incorporated into the same silicon substrates which form the imaging sensors.

SUMMARY

In accordance with one aspect, a rotational accelerometer includes a support structure. A first array of at least three substantially parallel cantilevered beams extends in a first direction away from the support structure. The first array is adapted to detect rotation about a first axis. A second array has at least three substantially parallel cantilevered beams, each extending away from the support structure in a second direction. The second array is adapted to detect rotation about a second axis. The first and second axes and the first and second directions are each angled with respect to one another.

DETAILED DESCRIPTION

Figure 1:
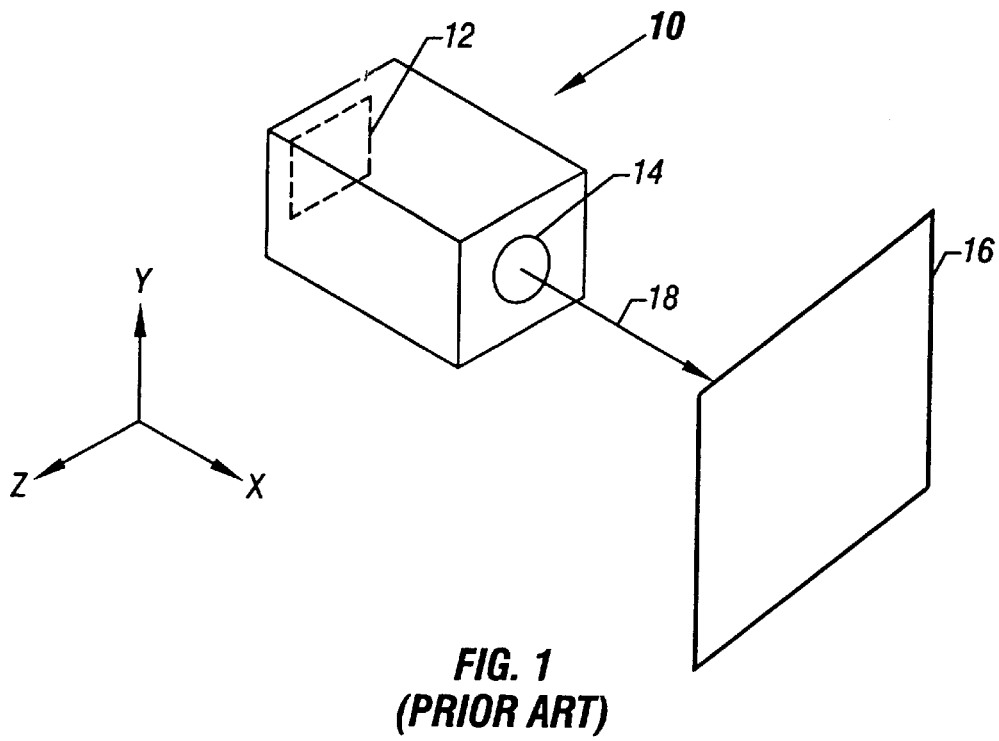
FIG. 1 is a perspective view of a camera in accordance with the prior art.

The camera 10, shown in FIG. 1, may include a lens 14 which has an optical axis 18. An imaging sensor 12 may capture an image of an object 16. The translational or rotational displacement of the camera 10 with respect to the object 16 may be resolved into rotation about one of the axes X, Y and Z and into translational motion along each of those axes. As a result of relative movement between the camera 10 and the object 16, a variety of distortions including magnification distortions and rotational distortions may occur.

In accordance with one embodiment of the present invention, rotation of the imaging sensor 12 about the Y and Z axes (for rotations in the XZ and XY planes) provides the most significant adverse effect on image quality. Thus, by measuring angular displacement in the XZ and XY planes and translation along the X axis, sufficient information may be obtained, in some embodiments of the present invention, to adequately compensate for the acceleration.

Thus, in one embodiment of the present invention, accelerometers which measure displacements in the XZ and XY planes may be provided. Advantageously, these accelerometers not only measure the direction and magnitude of the rotational displacements but also locate the center point of those rotations. This allows more accurate compensation, in the imaging device, for those displacements. The accelerometers may also measure X axis translation.

Figure 2:
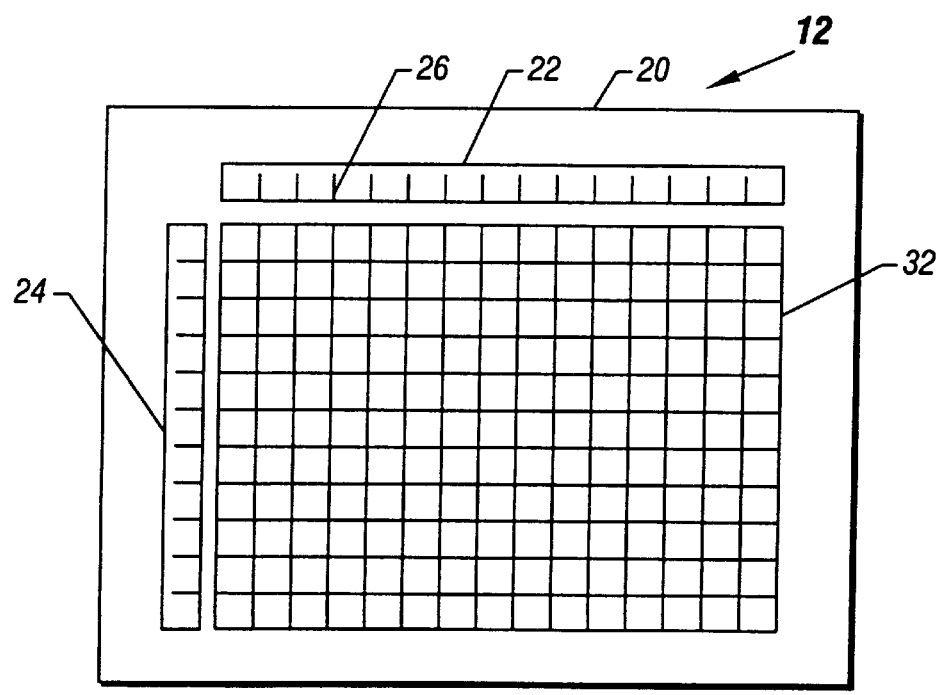
FIG. 2 is a greatly enlarged, top plan view of a semiconductor die incorporating an imaging sensor in accordance with one embodiment of the present invention.

Referring to FIG. 2, the imaging sensor 12 may be any of a variety of digital imaging sensors including complementary metal oxide semiconductor (CMOS) sensors or charge coupled device (CCD) sensors. An array of image capturing pixels 32 may be defined within a semiconductor substrate of a die 20 using well known technology. When the array 32 is exposed to an image, a plurality of pixels may capture an analog representation of that image which may be converted into a digital format and stored or displayed in an appropriate manner.

A first accelerometer 22 may be arranged to detect rotation about the Y axis and a second accelerometer 24 may be arranged to detect rotation about the Z axis. In this way, rotational acceleration in the XZ and XY planes may be resolved.

Figure 3:
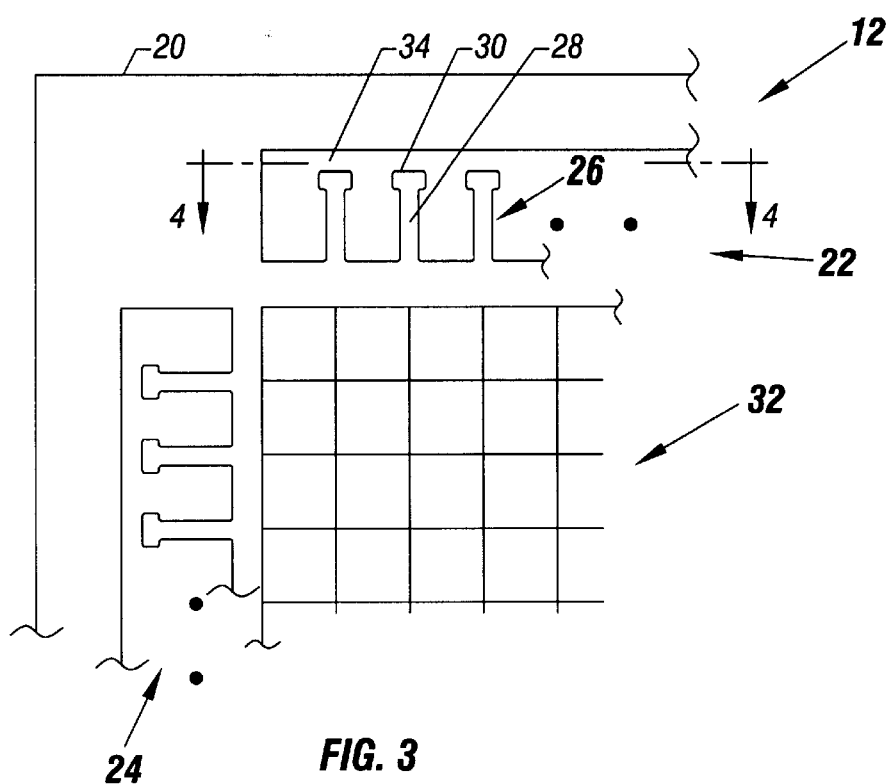
FIG. 3 is an enlarged depiction of a portion of the die shown in FIG. 2.

Referring now to FIG. 3, the accelerometer 22 may be formed of an array of at least three parallel cantilevered beams 26 each arranged to extend substantially parallel to one another substantially in the same direction. By the phrase "in the same direction", it is intended to refer to the direction from which the cantilevered beam flexure element 28 extends away from the point of connection to the die 20 to a proof mass 30 on the beam's free end. Thus, in the illustrated embodiment, each of the cantilevered beams 26 in the accelerometer 22 extend away from the substrate 20 to a proof mass 30 in the direction of the Y axis.

Similarly, the accelerometer 24 may be formed by a plurality of parallelly arranged cantilevered beams 26 which extend away from the substrate 22 substantially in the same direction corresponding to the Z axis. Generally, the greater the number of cantilevered beams 26, the better the resolution of the determination of the center of rotational displacement, as will be described hereinafter.

Figure 4:
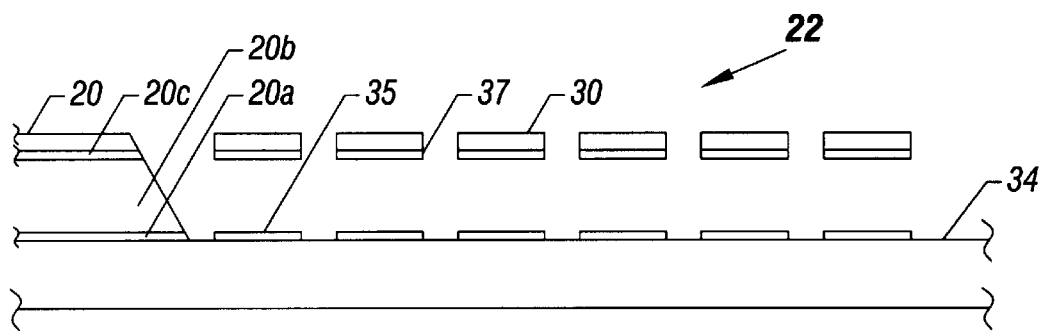
FIG. 4 is an enlarged cross-sectional view taken generally along the line 4—4 in FIG. 3.

Referring to FIG. 4, each of the cantilevered beams 26 has a proof mass 30 which is arranged over a depression 34 defined in the die 20. For example, the cantilevered beams 26 may be formed in a semiconductor substrate using appropriate etching techniques to define the proof masses 30, the flexure elements 28 as well as the depression 34.

In this way, cantilevered beam accelerometers may be formed using conventional micromachining techniques compatible with silicon substrates and conventional semiconductor technologies. As a result, the accelerometers may be formed in the same die 20 with the imaging sensor 12. This means that a convenient, low cost integrated device may be formed which not only detects and captures an image but also measures the displacement of the camera.

By forming a plurality of layers atop a semiconductor substrate, each of the components of the cantilevered beams 26 and the depression 34 may be formed by conventional etching and photolithographic techniques. For example, the beams may be defined by a combination of anisotropic etching followed by isotropic etching to define the beams as free-standing members. A plurality of layers may be deposited including the layers 20a and 20b and 20c. Etch stop layers may also be included as appropriate. The layer 20a may be formed of a conductive material such as a metal, a doped silicon, polysilicon or a silicide. The layer 20a may be defined by photolithographic techniques to form the lower plate 35 of a capacitor. The upper plate 37 of the capacitor may be defined by photolithographic techniques from a layer 20c which also may be formed of a suitable conductive material. The layer 20b may be formed of a suitable insulating material which is etched away in the process of forming the beams 26. In this way, a pair of opposed capacitor plates 35 and 37 is formed between the depression 34 and the beams 26.

Figure 5:
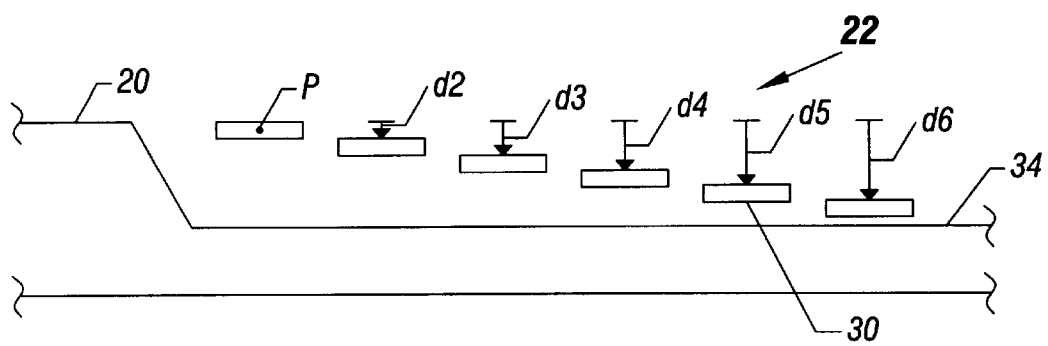
FIG. 5 is a view corresponding to FIG. 4 after the die has been rotated about an axis.

As a result of the rotation of the die 20 about a pivot point P, shown in FIG. 5, each of the proof masses 30 attempts to deflect by an amount proportional to its distance from the pivot point P. Thus, proof masses 30 deflect by amounts d2 through d6, in one embodiment, which amounts increase with distance from the point P, also called the "pivot offset" herein. Thus, it is a relatively simple mathematical determination to locate the pivot point P knowing the relative displacements of all the proof masses 30. The degree of rotational acceleration varies as the square of the pivot offset (x). By least squares fitting the pivot offset and acceleration to a simple second order equation, the linear acceleration "k" and the angular acceleration "a" can be determined. That is, the force (F) on the beams is a function of $k+ax^2$. The function is determined by the materials and geometry of the cantilevered beams.

Figure 6:
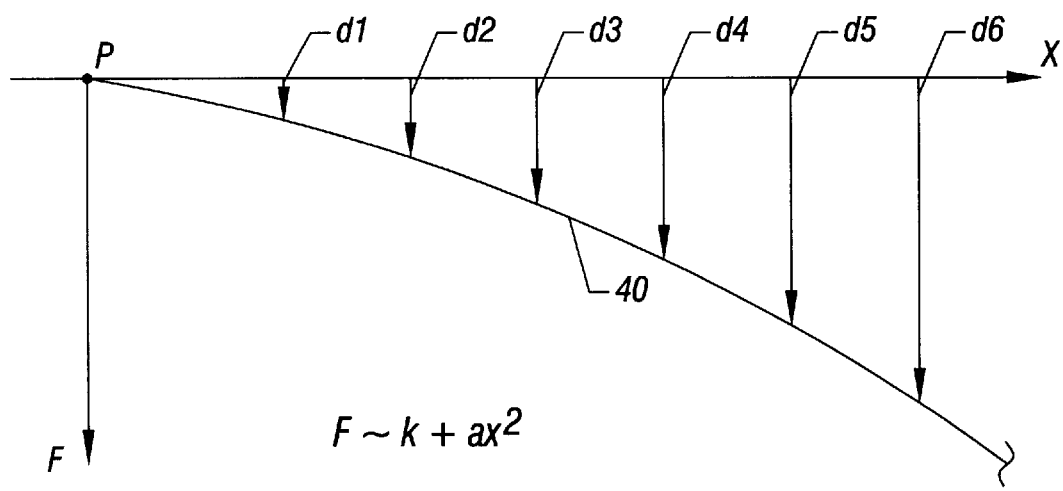
FIG. 6 is a graph of force versus offset in one hypothetical situation.
Figure 7:
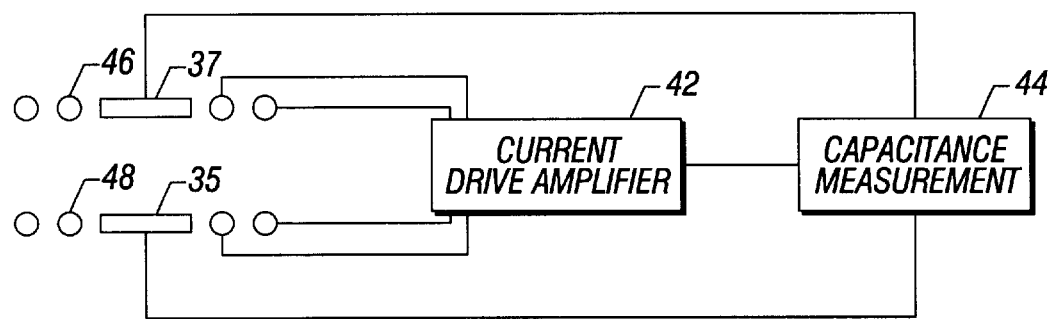
FIG. 7 is a schematic depiction of a current source used in one embodiment of the present invention.

Thus, the nature of the force (F) on the array of beams 26 forming one accelerometer may follow a parabolic curve as indicated at 42 in FIG. 6 in one embodiment of the invention. Generally, a parabola may be defined by at least three points. Thus, in the simplest embodiment, three cantilevered beams 26 may be used for each accelerometer 22 or 24. However, more beams may improve the accuracy of the accelerometer. Particularly since cantilevered beams may be noisy sensors, the more points that can be provided the better the curve fitting to the parabola. Thus, the more cantilevered beams which can be fabricated, the greater the accuracy of the resulting acceleration determination.

Since the beams may be formed from a silicon substrate using microelectronic techniques, the beams may be fabricated at low cost. Thus, at least three beams per accelerometer are desirable and the use of a plurality of beams in general is advantageous. In some embodiments, at least ten such beams 26 per accelerometer may be used.

Once determined, the rotational magnitude, direction and center can be associated with the acquired image and used by an image processing program to correct for motion blur. Since the accelerometers 22 and 24 are arranged at an angle with respect to one another, they can identify and quantify rotations about different axes. In addition, the flexure elements 28 extend away from the die 20, in the accelerometer 22 in a first direction and in the accelerometer 24 in a second direction. In one embodiment, the first and second directions are substantially perpendicular to one another.

In particular, in the illustrated embodiment, the accelerometers 22 and 24 are arranged at approximately right angles to one another. Thus, the accelerometer 22 may measure rotations about the Y axis while the accelerometer 24 may measure rotation about the Z axis. In addition, more complex rotations about both axes may be resolved by measuring the displacements of the proof masses in each accelerometer 24 and 22. In this way, one can economically determine both the translation in the X direction and the rotational displacement in the XZ and XY directions.

The displacement of the individual proof masses 30 may be determined in a number of different ways. The displacement may change the distance between a capacitor plate on the substrate 34 and the proof mass 30 which acts as the plate of capacitor. As a result, the capacitance varies as the proof mass deflection increases away from the rest condition.

In any measurement system in which the cantilevered beams are deflected, non-linearities, arising from the design of the beam, may be introduced into the calculation. While these non-linearities may be accounted for using suitable calibration techniques and by careful design, in some cases it is desirable to avoid these non-linearities.

In one technique, the plates 35, 37 may be exposed to magnetic fields which oppose the displacement of the beams relative to the depression 34. A measurement may be made of the amount of current needed to develop an appropriate magnetic field to maintain the beam at a defined separation from the depression. This measurement is linearly related to the amount of force applied to the cantilevered beam.

A magnetic field may be generated by a stack of coils associated with each cantilevered beam and a coil in opposition in the adjacent portion of the depression 34. A current drive amplifier can provide current in a desired direction to create either an attractive or repulsive magnetic field between each cantilevered beam and its associated coil and another coil in an adjacent region of the depression 34.

Preferably, the coils may be formed by conventional technique in a relatively flat configuration. Each coil may be made up of a small number such as one or two turns. The proof mass may include a stack of coils with a couple of turns. The magnetic field produced is a function of the current applied by the current drive amplifier. The coils may be formed about a core by lithographic techniques commonly used to make thin film magnetic read heads for disk drives. See for example, U.S. Pat. No. 5,896,254.

Thus, in one technique, the plates 35 and 37 may be biased to maintain the cantilevered beams in their original positions. Referring to FIG. 6, a current drive amplifier 42 may create an attractive or repulsive magnetic field to either cause the beams to be attracted towards the die 20 or to cause them to move away from the die 20. The direction of the field and its magnitude may be determined by measuring the capacitance between the plates using the capacitance measuring device 44. The capacitance may be maintained substantially at a preset level, by developing the necessary magnetic fields using the coils 46 and 48 to maintain the preset spacing. To the extent that deflection of the beams can be eliminated, the calculations become simpler and more linear.

In one embodiment, the plates 35, 37 may be coupled to an oscillator to vary its frequency as an indication of the capacitance of the plates. As the frequency varies from the idle condition, a phase locked loop output may cause a greater correction field to be applied to the plates. In this case, the phase lock loop output is a more direct and linear indicator of the acceleration. In one embodiment, by keeping the deflection as small as possible, the acceleration is measured linearly.

However, other capacitive techniques may be utilized as well. In addition, strain gauges may be provided on the cantilevered beams 30, for example using piezoresistive techniques to measure deflection. The circuitry for analyzing the displacement of the beam may be integrated into the die 20.

Once the direction, magnitude and pivot point location of the rotational displacement are known, hardware or software may by used to mathematically process the images to correct for any blurring that would otherwise occur. See, e.g., U.S. Pat. No. 5,459,126 and 5,504,523. While the present invention has been described in connection with techniques for detecting and measuring displacement which would cause blurring, the techniques described herein may be utilized to measure a variety of other forces and effects. For example, the present invention may be useful in measuring angular velocities, angular acceleration, gravitation fields, electric fields, magnetic fields, viscous drag and other drag forces in a variety of different applications.

In some imaging embodiments, it is desirable to obtain information limited to the rotation about the Y and Z axes and X translation. In those cases, sufficient information may be obtained to provide an accurate blurring correction. In cases where greater accuracy is desired, an additional accelerometer may be aligned in a plane orthogonal to the plane occupied by the accelerometers 22 and 24. This may be done in a variety of different ways. In one embodiment, an image processor is electrically coupled to the imaging sensor. The image processor does the image processing on the data developed by the imaging sensor. The image processor integrated circuit may be arranged within the camera housing at the appropriate orientation to provide an accelerometer which measures rotation about the X axis. Namely, by positioning the die forming the image processor in a plane orthogonal to the plane of the die forming the imaging sensor and incorporating an appropriate accelerometer onto the image processor chip, a third degree of rotational information may be obtained.

The data developed by the accelerometers may be processed on the imaging sensor integrated circuit using circuitry integrated thereon. The results of the analyses may then passed onto the image processor for further analysis. Alternatively, the raw data from the imaging sensor may be passed to the image processor for computation and analysis thereon.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A rotational accelerometer comprising:
   a support structure;
   a first array of at least three substantially parallel cantilevered beams, each extending away from said structure in a first direction, said beams adapted to provide information about rotation about a first axis; and
   a second array of at least three substantially parallel cantilevered beams, each extending away from said structure in a second direction, said beams adapted to provide information about rotation about a second axis, said first and second axes and said first and second directions, each being angled with respect to one another.

2. The accelerometer of claim 1 wherein said support structure is a semiconductor substrate and said first and second arrays are defined therein by micromachining.

3. The accelerometer of claim 1 further including a circuit adapted to apply potentials to said beams to cause said beams to resist displacement in response to displacement of said support structure.

4. The accelerometer of claim 1 wherein said beams of each array are arranged to have a parabolic force distribution.

5. The accelerometer of claim 1 wherein said support structure is an imaging sensor and said first and second arrays are integrated into said imaging sensor.

6. The accelerometer of claim 5 wherein said cantilevered beams are adapted to indicate information about the motion of said imaging sensor so as to correct blurring resulting from the motion of the sensor relative to an object being imaged.

7. A method of providing information about the displacement of an integrated circuit die comprising:

measuring the forces applied to a first set of a plurality of cantilevered beams formed in said die; and determining the pivot point of a rotational forces applied to said die by curve fitting a parabola to a measure of the forces applied to said cantilevered beams.

8. The method of claim 7 further including measuring the forces applied to a second set of a plurality of cantilevered beams formed in said die.

9. The method of claim 7 further including measuring the capacitance between said cantilevered beams and a proximate surface in order to obtain a measure of the forces on said cantilevered beams.

10. The method of claim 7 further including measuring the amount of current which must be applied to develop an magnetic field sufficient to maintain the cantilevered beams against displacement in response to a displacement of said die.

11. The method of claim 7 further including using said information about rotational displacement to correct blurring resulting from motion of an integrated circuit imaging sensor die relative to an object being imaged.

12. An imaging device comprising:

an imaging sensor including a plurality of pixels adapted to develop an indication of an object to be imaged along an imaging axis;

a pair of accelerometers adapted to measure rotational forces applied to said imaging sensor about two different axes perpendicular to the imaging axis of said imaging sensor; and a device adapted to measure the translation of said imaging sensor along the imaging axis of said imaging sensor.

13. The device of claim 12 wherein said imaging sensor is formed in a substrate, said accelerometers each including an array of at least three substantially parallel cantilevered beams, each extending away from said substrate in the same direction, said beams adapted to detect rotation about an axis, the beams of each accelerator being angled with respect to the beams of the other accelerator such that each accelerator measures rotational forces about a different axis.

14. The device of claim 13 wherein said arrays are defined in said substrate by micromachining.

15. The device of claim 13 further including a circuit adapted to create a magnetic field to cause said beams to resist displacement in response to displacement of said imaging sensor.

16. The device of claim 15 wherein said beams of each array are arranged to have a parabolic force distribution.

17. The device of claim 13 wherein each of said arrays of beams are oriented transversely to the other array.

* * * * *